United States Patent [19]
Jo

[11] Patent Number: 5,237,462
[45] Date of Patent: Aug. 17, 1993

[54] VIDEO RECORD STOP TIME SETTING METHOD

[75] Inventor: Seong-U Jo, Seoul, Rep. of Korea

[73] Assignee: SamSung Electronics Co., Ltd., Suwon, Rep. of Korea

[21] Appl. No.: 405,191

[22] Filed: Sep. 11, 1989

[30] Foreign Application Priority Data

Dec. 22, 1988 [KR] Rep. of Korea ............... 1988-17164

[51] Int. Cl.⁵ ............................................ H04N 5/782
[52] U.S. Cl. .............................. 360/33.1; 358/191.1; 358/194.1; 358/335; 369/19
[58] Field of Search .............. 358/335, 191.1, 194.1; 360/33.1, 15; 369/19

[56] References Cited

U.S. PATENT DOCUMENTS 4,193,120  3/1980  Yello .......................... 358/335 X
4,717,970  1/1988  Long ............................ 358/335

OTHER PUBLICATIONS

Toshiba Owner's Manual for Video Cassette Recorder-VS36, 1983, pp. 7, 24-27.

Primary Examiner—W. R. Young
Attorney, Agent, or Firm—Robert E. Bushnell

[57] ABSTRACT

A video record stop time setting method for a VCR capable of setting the video recording period at a user's discretion by setting or changing the video record stop time at any time. The invention includes: an N second timer counting method for displaying ERS mode on the digitron; a video record stop time setting method for displaying and storing the video record stop time setting data; and a video record stop method for stopping the video recording when the video record stop time setting data and the present time data are equal. According to the invention, the video recording period of time can be set conveniently at a user's discretion.

12 Claims, 2 Drawing Sheets

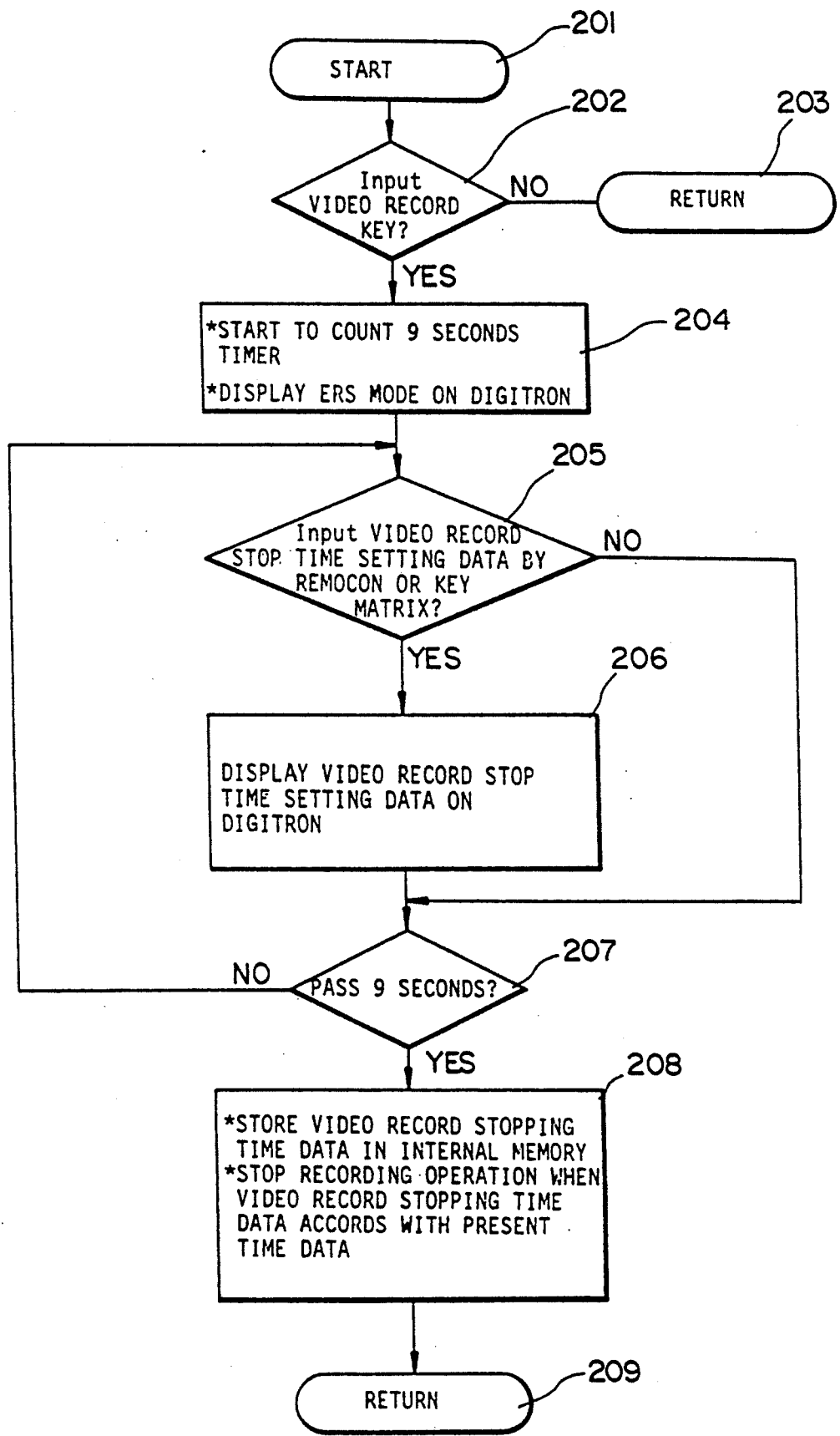

VIDEO RECORD STOP TIME SETTING METHOD

BACKGROUND OF THE INVENTION

The present invention relates to a video record stop time setting method for a video cassette recorder which inputs or changes the video record stop time at any time making it possible to set the video recording period at a user's discretion.

In the art of the present invention, a system capable of establishing or changing the video record stop time at any time, even if during recording is called an ERS (easy recording system). The present invention is related to a stop time setting method for such an ERS.

Heretofore, in selecting the video record stop time for a VCR, there has been a method wherein the recording operation is stopped only when a user presses the record stop key and a method for setting the recording period by pressing a key a number of times, each press incrementing the recording period by a predetermined time unit.

At this moment, a system for setting the recording period by a key is called OTR (one touch recording), and in such OTR, when the standard recording period of time is 30 minutes, it can be used reasonably only when the length of the video recording program is a multiple of 30 minutes, otherwise, too much or too little of the program will be recorded.

Therefore, in selecting the video record stop time, there are disadvantages in using the OTR system due to the problem as aforementioned and in using the system of selecting the video record stop time by pressing the stop key manually.

BRIEF SUMMARY OF THE INVENTION

Therefore, the present invention was conceived to solve such problems, and it is an object of the present invention to provide a method for setting a video record stop time which can be used conveniently because the video recording period can be changed voluntarily according to the discretion of a user by employing the ERS function.

According to one aspect of the present invention, video recording is stopped at the established video record stop time by setting the video record stop time during recording or at any time.

According to another aspect of the present invention, the video recording period can be selected more conveniently and correctly by utilizing the ERS function for selecting the video recording period by setting the video record stopping time on the basis of the present invention, at the same time, the video recording time can be set or changed during recording or at any time.

The foregoing and other objects as well as advantages of the present invention will become clear by the following description of the invention with reference to the accompanying drawings.

BRIEF DESCRIPTION OF THE DRAWINGS

For a better understanding of the invention, and to show how the same may be carried out into effect, reference will now be made, by way of example, with respect to the accompanying drawings, in which:

FIG. 2 is a flow chart of a preferred embodiment of the present invention.

DETAIL DESCRIPTION OF THE INVENTION

Figure 1:
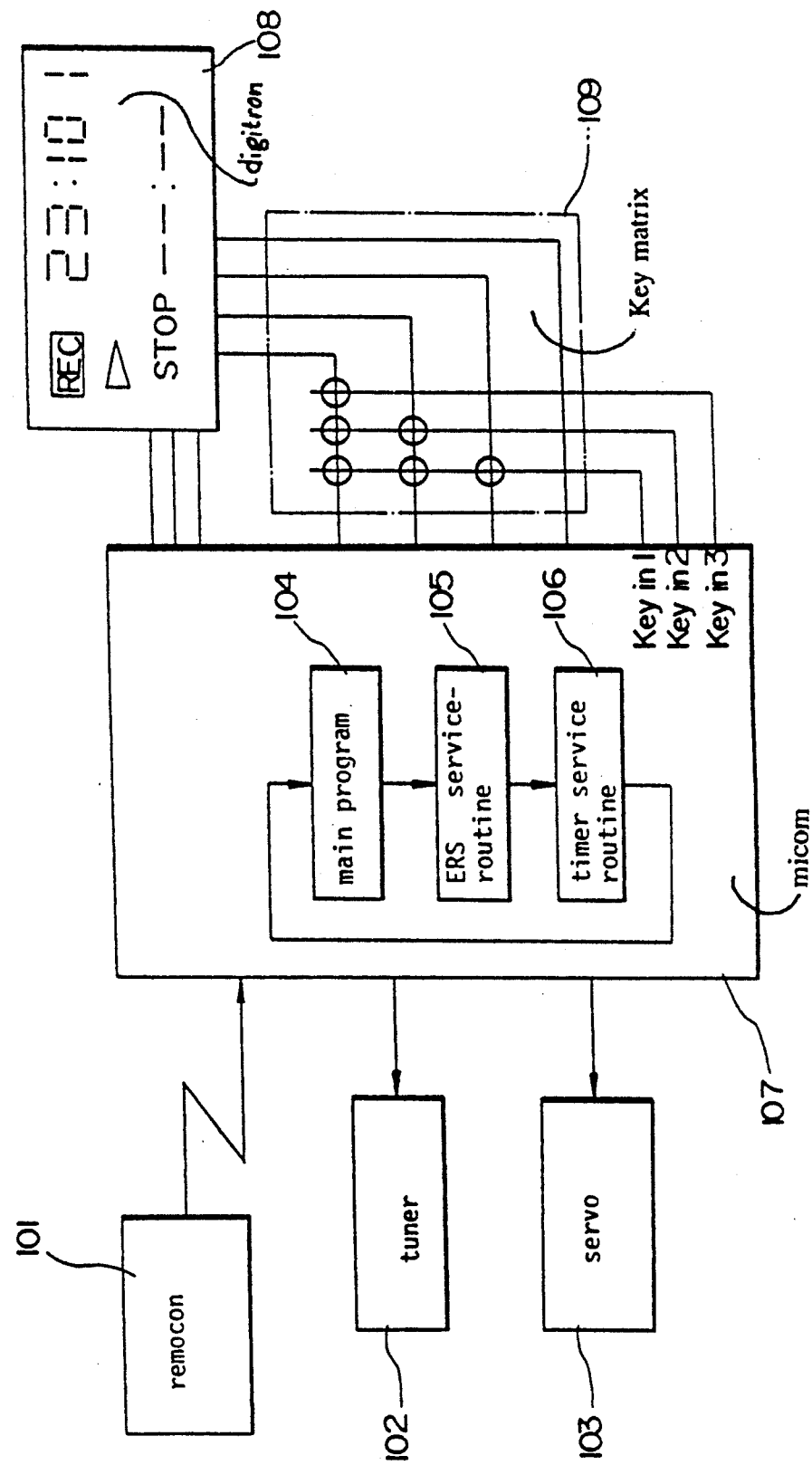
FIG. 1 is a block diagram of a preferred embodiment of the present invention.

Hereinafter, a preferred embodiment of the present invention will be described in detail with reference to the accompanying drawings.

FIG. 1 is a general block diagram of a preferred embodiment of the present invention, in which, while a system control micom 107, microcomputer carries out a main program 104, until the record key or the RES key at the remocon 101, remote controller, or at the key matrix 109 is pressed, at which time the micom displays the present time and the channel number as well as the video record stop time on the digitron 108, digital, (at this moment, the record stop time is not displayed as shown in the drawing).

When the system control micom 107, carrying out the main program 104, recognizes the pressing of the record key or ERS mode key, it executes the setting or changing operational function of the record stop time at ERS service routine 105, and stores the video record stop time data in the internal memory, simultaneously displaying the data on the digitron 108. Then the micom receives the output of the timer at the timer service routine 106 and, at the designated video record stop time, sends the data to the tuner 102 and servo 103 to thereby stop the video recording operation.

FIG. 2 is a flow chart illustrating the logical flow of operation of the present invention: starting at block 201, confirming whether or not a record key input is present at block 202, calculating the output data of timer at block 204, when record key input is present, and starting to count up to 9 seconds, at the same time, displaying the ERS mode on the digitron 108 and then, checking whether or not the input of the video record stop time setting data according to the remocon 101 or key matrix 109 is present, and when no data are input, counting up to 9 seconds, and when any data are inputted, displaying on the digitron 108.

That is to say, if the video record stop time setting data is input within 9 seconds after the video record key is pressed, the VCR will display the data at this moment on the digitron 108, but if the video record stop time setting data is not input before 9 seconds have elapsed, the VCR will continue its usual video record mode.

If the video record stop time data is input within 9 seconds after the video record key is pressed, the invention will stop the recording operation when the video record stop time data stored in the internal memory and the present time data input from the timer service routine match at block 208, and will execute main program again.

The present invention recognizes the functional key pressing at either the remocon 101 or the key matrix 109, and executes the ERS service routine 105, at the main program 104 of the system control micom 107 and then sets the video record stop time.

While executing the main program 104, if the video record key or ERS mode key of the remocon (remote controller) 101 or key matrix 109 is pressed, the system control micom (microcomputer) 107 recognizes this and displays the state, present time, selected channel to be recorded, and video record stop time on the digitron 108. However, before setting the video record stop time, nothing is displayed as shown in the drawing.

If while executing the main program 104, if the video record key is pressed on the remocon 101 or key matrix 109, the micom executes the ERS service routine 105 and displays the data on the digitron 108, at the same time, receiving the input of the video record stop time data.

When the micom recognizes the video record stop data according to the time setting key at the ERS service routine 105, it stores the data into the internal memory of the system control micom 107 and then, compares it to the present time data fed by the operation of the timer service routine 106.

That is to say, it compares the video record stop data set at the ERS service routine 105 to the present time data fed at the timer service routine 106, and when the compared data becomes accorded at the system control micom 107, it sends the data to the tuner 102 and servo 103 and stops the video recording operation.

Reviewing the ERS service routine 105 of such operation in more detail, it will be as follows:

The system control micom 107 judges whether or not the video record key is pressed, and if the video record key is not pressed, it executes the original main program 104. When the video record key is pressed, it clears the counter for counting the time data input from the timer to the initial state. At the same time, the ERS mode (present time, channel number, display of video state) is displayed on the digitron 108.

The reason for executing the counting operation by clearing the counter in preparation for counting 9 seconds is so that the micom can return to the general video record mode in case the video record stop time data is not input during 9 seconds after the video record key is pressed.

That is, when the video record stop time data is not input during 9 seconds after inputting the video record key, the micom executes the general video record mode of the main program When the video record key is input, as shown in FIG. 1, the ERS mode is displayed on the digitron 108 and thereafter, whether or not there is input of the video record stop time data at the remocon 101 or the key matrix 109, and when a user inputs the video record stop time data in order to set the video record stop time, the video record stop time data set at this time is displayed on the digitron (digital display) 108.

That is, when the video record stop time data is input within 9 seconds after inputting the video record key, the video record stop time of the ERS is displayed on the digitron 108, and the video record stop time at this moment becomes set by utilizing the time setting key of either the remocon 101 or the key matrix 109.

After the video record stop is set and displayed on the digitron 108, the video record stop data at this moment is stored in the internal memory of the system control micom 107 and thereafter, drives the timer service routine 106, and compares the video record stop time with the present time data applied from the timer service routine 106.

That is, when the video record stop time is input, this is displayed on the digitron 108, and at the same time, stored into the internal memory. The video record stop data stored into the internal memory is compared with the present time data applied from the timer service routine 106.

When the video recording operation is advanced after setting the video record stop time and the video record stop time matches the present time, the micom recognizes that the video record stop data stored into the internal memory and the present time data have become accorded, and stops the video recording operation.

That is, when the video record stop time and the present time are accorded, the micom outputs the data to the tuner 102 and servo 103, and thereby stops the video recording operation.

The present invention makes it possible to input the stop time during video recording operations and change a previously set video record stop time by utilizing the ERS mode key even during the video recording operation.

Since the present invention is able to set the video record stop time at the time of starting the video recording and during the video recording or at any time, the video recording period of time can be controlled at a user's discretion and thereby provides increased convenience.

It will be appreciated that the present invention is not restricted to the particular embodiment that has been described hereinbefore, and that variations and modifications may be made therein without departing from the spirit and scope of the invention as defined in the appended claims and equivalents thereof.

I claim:

1. A process for setting a video record stop time of a video cassette recorder, comprising:
    displaying an easy record mode on a display for a predetermined time period in response to a first video record key input;
    if video record stop time setting data is entered during said predetermined time period, displaying said video record stop time setting data on said display and storing said video record stop time setting data into an internal memory;
    controlling video recording of said video cassette recorder in response to said video record stop time setting data stored in said internal memory; and
    during said video recording, prompting for and detecting entry of updated said record stop time setting data in response to a second said video record key input, storing said updated record stop time setting data into said internal memory, and terminating said video recording in response to said updated video record stop time setting data.

2. A video record stopping time setting method according to claim 1 further comprised of in response to the video record key input, prompting for input of a present time, channel number, mode of video recording state, and the video record stop time setting data.

3. A process as set forth in claim 1, wherein said video record stop time setting data is entered independently of video record start time data.

4. A method for setting video record stop time in a video tape recorder, said method comprising:
    performing a recording operation;
    during said recording operation, receiving video record stop time data;
    storing said video record stop time data; and
    ending said recording operation in dependence upon results of comparisons between the stored video record stop time data and a current time.

5. A process as set forth in claim 4, wherein the step of receiving said video record stop time data comprises:
    initiating a count sequence upon reception of a start signal; and
    waiting to receive said video record stop time data only until said count sequence reaches a predetermined value.

6. A video recording process as set forth in claim 4, wherein said video record stop time data is entered independently of video record start time data.

7. A method for controlling a video tape recorder, said method comprising:
- in response to a first user selection of a programming mode, prompting for and detecting input of a record begin time and a record end time;
- initiating a recording operation in response to said record begin time;
- during said recording operation, prompting for and detecting input of an updated said record end time in response to a second user selection of said programming mode; and
- terminating said recording operation in response to said updated record end time.

8. A method as claimed in claim 7, wherein said programming mode is an Easy Record System type.

9. A method as claimed in claim 8, wherein the step of prompting for and detecting input of said record end time comprises:
- initiating a count sequence upon user selection of a record key;
- waiting to receive user input of said record end time only until said count sequence reaches a predetermined value.

10. A method for controlling a video tape recorder, said method comprising:
- in response to a first user selection of a record key, prompting for and waiting for user input of a record end time;
- initiating a recording operation even if said record end time is not input;
- during said recording operation, prompting for and waiting for input of an updated said record end time in response to a second user selection of said record key; and
- after said second user selection, terminating said recording operation in response to said updated record end time.

11. A method as claimed in claim 10, wherein said programming mode is an Easy Record System type.

12. A method as claimed in claim 11, wherein the step of prompting for and waiting for user input of said record end time comprises:
- initiating a count sequence upon user selection of said record key;
- waiting to receive user input of said record end time only until said count sequence reaches a predetermined value.

* * * * *

UNITED STATES PATENT AND TRADEMARK OFFICE
CERTIFICATE OF CORRECTION

PATENT NO. : 5,237,462
DATED : August 17, 1993
INVENTOR(S) : 5,237,462

It is certified that error appears in the above-indentified patent and that said Letters Patent is hereby corrected as shown below:

Column 3, Line 34, After "program", Insert --104.--.

Signed and Sealed this

Eighteenth Day of October, 1994

Attest:

BRUCE LEHMAN

Attesting Officer     Commissioner of Patents and Trademarks